G. J. PLATO.
SHOCK ABSORBER.
APPLICATION FILED JUNE 14, 1910.
1,037,524.
Patented Sept. 3, 1912.
3 SHEETS—SHEET 1.
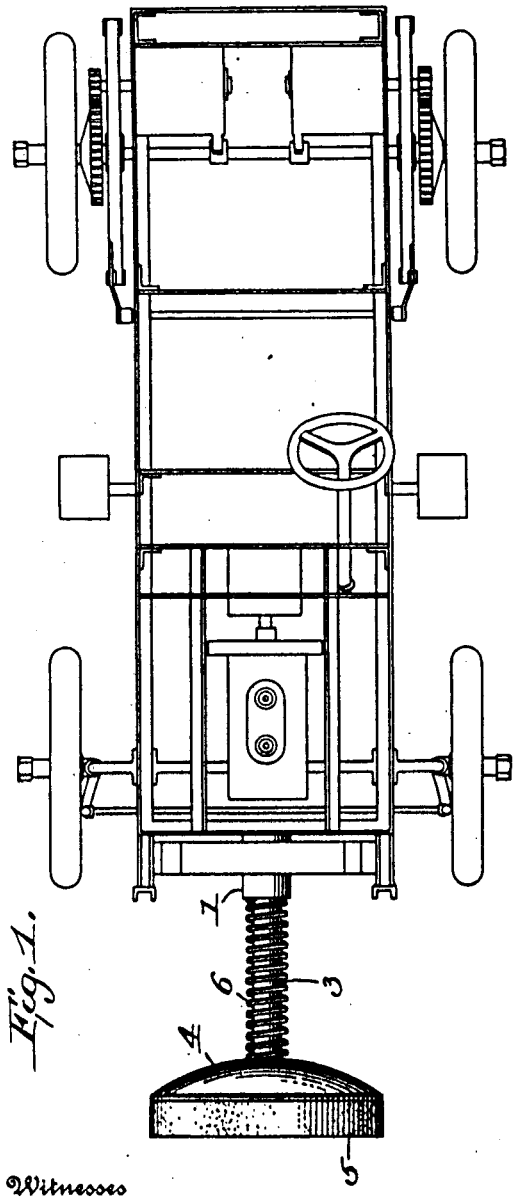
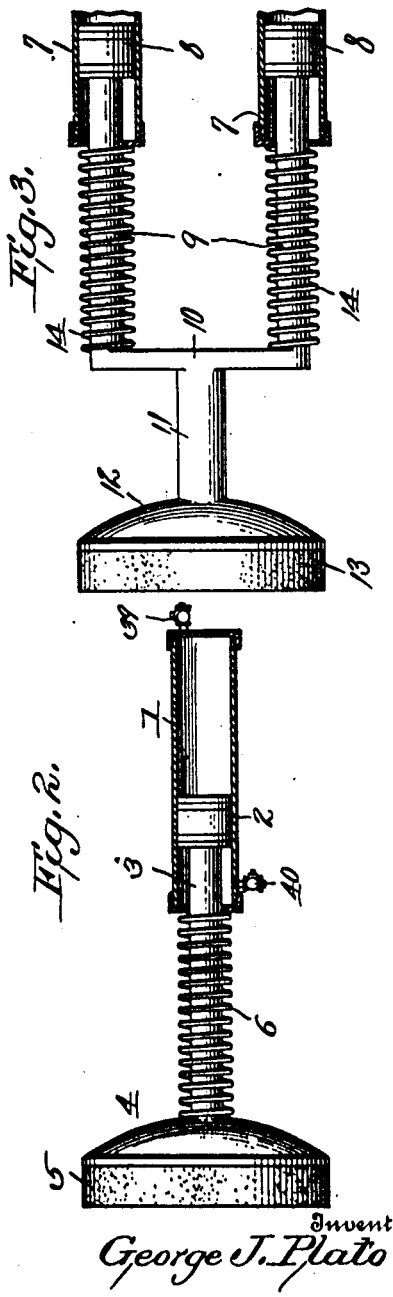
Witnesses
Olive N. Holmes
I. Burch.
Inventor
George J. Plato
By
J. H. Hill, Attorney G. J. PLATO.
SHOCK ABSORBER.
APPLICATION FILED JUNE 14, 1910.
1,037,524.
Patented Sept. 3, 1912.
3 SHEETS—SHEET 2.
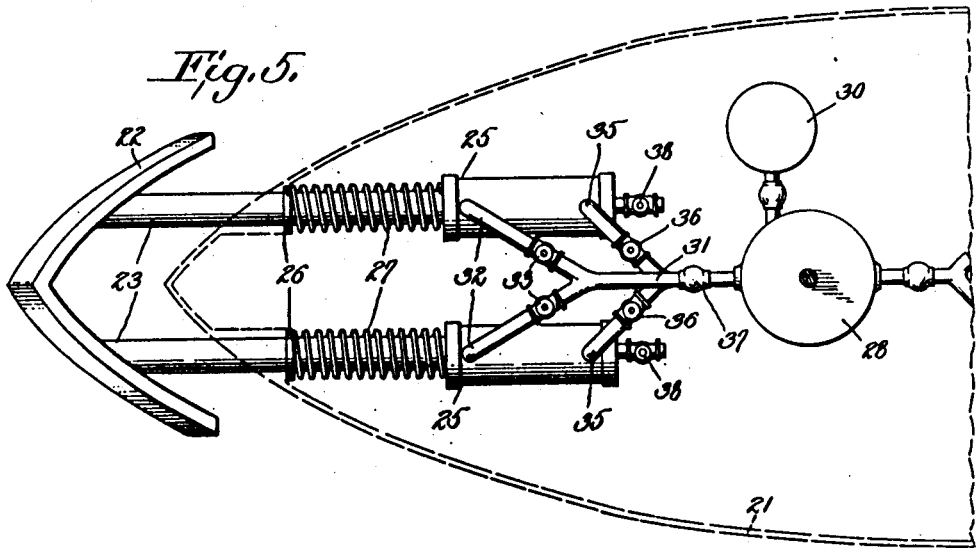
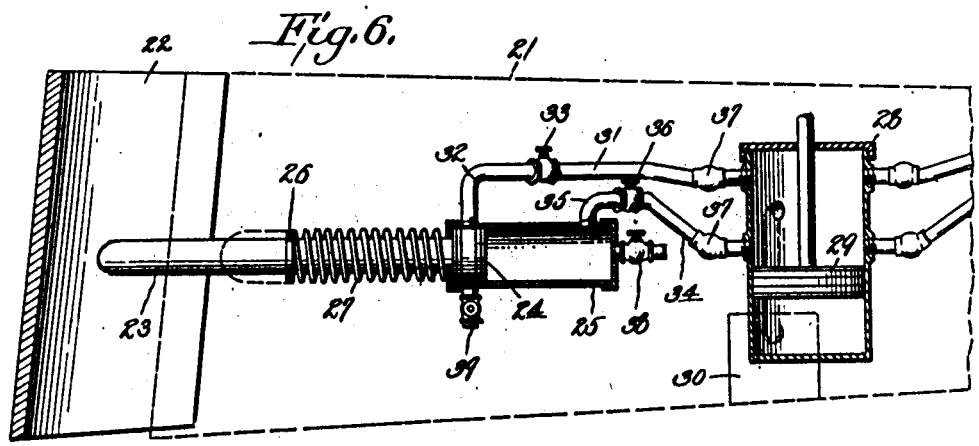
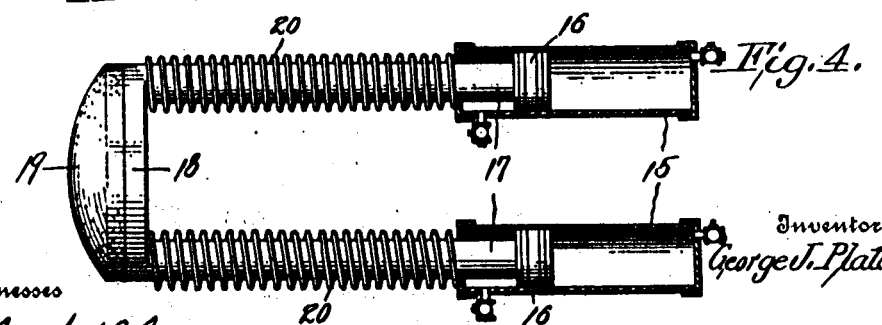
Witnesses
Inventor
George J. Plato
By
Attorney

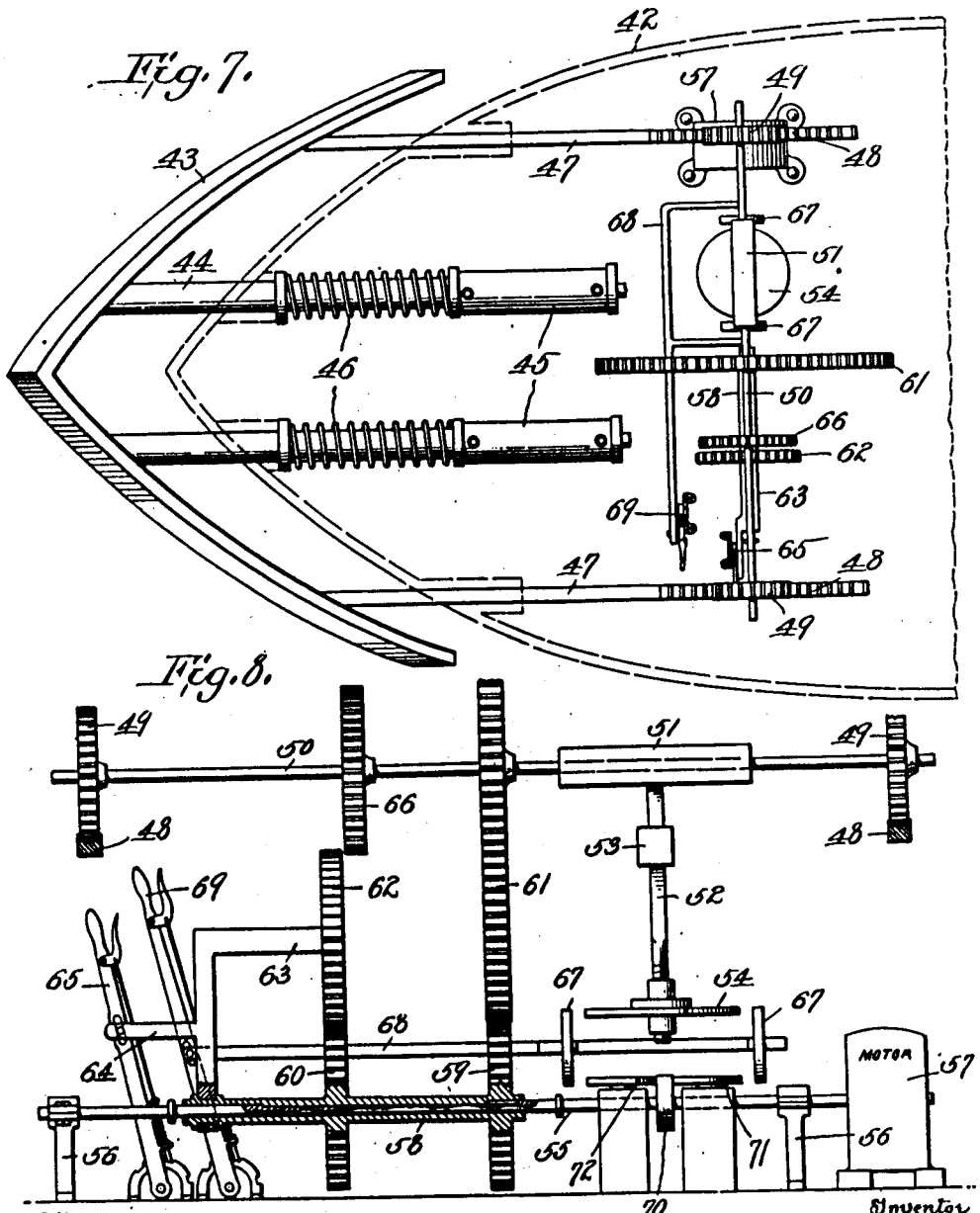

UNITED STATES PATENT OFFICE.

GEORGE J. PLATO, OF SAN FRANCISCO, CALIFORNIA.

SHOCK-ABSORBER.

1,037,524.　　　Specification of Letters Patent.　　Patented Sept. 3, 1912.

Application filed June 14, 1910. Serial No. 566,743.

*To all whom it may concern:*

Be it known that I, GEORGE J. PLATO, a citizen of the United States, residing at San Francisco, in the county of San Francisco and State of California, have invented certain new and useful Improvements in Shock-Absorbers, of which the following is a specification.

The present invention is in the nature of a novel shock absorber which is designed to be applied to automobiles, cars, marine vessels, air ships, and the like, for the purpose of absorbing the jar or shock in the event of a collision and preventing injury to the device to which it is applied, and also to prevent the consequent loss of life.

The object of the invention is the provision of a shock absorber which is simple and inexpensive in its construction, which is compact in design, which can be readily applied to a motor vehicle or like device, and which will operate in an effective manner to absorb the shock or jar in the event of a collision.

With these and other objects in view the invention consists in certain combinations and arrangements of the parts as will more fully appear as the description proceeds, the novel features thereof being pointed out in the appended claims.

For a full understanding of the invention reference is to be had to the following description and accompanying drawings, in which:

Figure 1 is a top plan view of an automobile having the improved shock absorber applied thereto. Fig. 2 is a top plan view of the shock absorber detached, the air cylinder being shown in section. Fig. 3 is a similar view of a slightly modified form of the shock absorber. Fig. 4 is a similar view of a still further modification of the shock absorber. Fig. 5 is a plan view of a modified form of the shock absorber designed to be applied to a marine vessel, Fig. 6 is a longitudinal sectional view through the same, Fig. 7 is a top plan view showing a still further modification of the invention as applied to a ship, and Fig. 8 is a front elevation of the gearing for positively moving the shock absorber in and out.

Corresponding and like parts are referred to in the following description and indicated in all the views of the drawing by the same reference characters.

In Fig. 1 of the drawings the shock absorber is applied to an automobile, and as is shown more clearly in Fig. 2, this shock absorber comprises an air cylinder 1 having a piston 2 mounted therein, the said piston being connected to a piston rod 3 which extends through the forward end of the air cylinder and is connected to the head 4 which has the body 5 of the shock absorber applied thereto. The air cylinder 1 may be applied to the frame of an automobile or the like in any suitable manner and is arranged so that the piston rod 3 and head 4 carried thereby project in front of the automobile. A coil spring 6 surrounds the piston rod 3 and is interposed between the head 4 and the air cylinder 1, and the body 5 of the shock absorber is preferably formed of rubber or some similar material. In the event of a collision, the head 4, piston rod 3, and piston 2 are moved rearwardly and air is compressed between the said piston and the rear end of the air cylinder. This compressed air acts as a cushion and coöperates with the coil spring 6 to absorb the shock and jar and either prevent or very materially reduce the injury to the automobile or other device to which the shock absorber has been applied. Particular attention is directed to the fact that the present shock absorber is peculiarly designed so as to combine the action of both the metallic spring and the compressed air for reducing the shock, such a construction being superior to a device which depends entirely upon a single cushioning means for producing the desired result.

In a slightly modified form of the invention as shown in Fig. 3 two air cylinders 7 are utilized, the said air cylinders being arranged in a parallel relation to each other and each of the cylinders having a piston 8 mounted therein. These pistons 8 are connected to piston rods 9 which project in front of the cylinders and have their forward ends connected by a cross bar 10. An arm 11 projects forwardly from an intermediate portion of the cross bar 10 and has the head 12 applied to the extremity thereof, the said head carrying the body portion 13 of the shock absorber. Coil springs 14 surround the two piston rods 9 and are interposed between the cross bar 10 and the air cylinders 7. As in the previous instance, should the automobile or other device to which this shock absorber was applied, be involved in a collision, the pistons 8 would be moved rearwardly in the air cylinders 7 and the air which would thereby be compressed in the said air cylinders 7 would coöperate with the two coil springs 14 to absorb the shock.

A still further modification is shown in Fig. 4 in which a pair of air cylinders 15 are utilized as in the previous instance, each of the air cylinders having a piston 16 mounted therein and the said piston being connected to piston rods 17 which project in front of the cylinders and are connected by the head 18 having the body 19 of the shock absorber applied thereto. Coil springs 20 surround the piston rods 17 and are interposed between the head 18 and the cylinders 15. The operation of this shock absorber is identical with that previously described, the air which is compressed in the air cylinders coöperating with the coil springs to absorb and reduce the shock.

In Figs. 5 and 6 is shown a form of the shock absorber adapted to be applied to marine vessels. The hull 21 of the vessel is indicated by dotted lines, and the shock absorber 22 may be applied either to one or both ends thereof. This shock absorber 22 is formed with diverging sides and is so constructed that when retracted it will fit snugly against the pointed end of the hull, while when projected into an operative position it will be spaced from the hull. Piston rods 23 are connected to opposite sides of this shock absorber 22 and extend into the interior of the hull where they are connected to pistons 24 operating within air cylinders 25. Collars 26 are fitted upon these piston rods 23 and coil springs 27 surround the said piston rods and are interposed between the collars 26 and the air cylinders 25. An air pump 28 is arranged within the hull of the vessel and has a piston 29 mounted therein, any suitable means (not shown) being employed for operating this piston of the air pump. A feed pump 30 is shown as provided for the air pump 28. A pipe 31 leads from the air pump 28 and is formed with the branches 32 which communicate with the forward end of the air cylinders 25, valves 33 being interposed in the length of the said branches 32. In a similar manner, a pipe 34 also leads from the air pump and is formed with the two branches 35 which communicate with the rear ends of the air cylinders 25, valves 36 being interposed in the length of the said branches. Each of the pipes 31 and 34 is provided with a check valve 37 which prevents air from passing from the air cylinders 25 back through the pipes into the air pump 28. A release valve 38 is applied to the rear end of each of the air cylinders 25 and in a like manner a release valve 39 is applied to the forward end of each of the cylinders. Under normal conditions, the valves 33 and 36 are closed, the release valves 38 are also closed, while the release valves 39 are open. Should the ship strike upon a rock, collide with another vessel, or run into a dock the piston rods 23 and pistons 24 would be moved rearwardly so as to compress air in the air cylinders 25 and also compress the springs 27 between the collars 26 and the air cylinders 25. This combined action of the compressed air and the coil springs, would, as in the previous instance, tend to absorb the shock and jar and either reduce or entirely prevent injury to the ship. Should it be desired to withdraw the shock absorber into an inoperative position, the release valves 38 at the rear ends of the air cylinders would be opened, the release valves 39 at the forward ends of the cylinders closed, the valves 36 of the branches 35 leading to the rear ends of the cylinders closed, and the valves 33 of the branches 32 leading to the forward ends of the cylinders opened. The air pump would then be operated and air would be forced into the forward ends of the cylinders so as to move the pistons 24 rearwardly within the cylinders and retract the shock absorber into an inoperative position. In a reverse manner, the pistons 24 could be moved forwardly so as to throw the shock absorber into an operative position by reversing the condition of the valves and causing the air to be forced into the rear ends of the cylinders behind the pistons. The shock absorber would then be under complete control, and could either be held in an operative or inoperative position as desired. The shock absorber itself would probably be a total loss in case of a collision, but it would serve to prevent or reduce the injury to the vessel to which it was applied.

If found desirable, as indicated in Figs. 2 and 4, the air cylinders 1 may be provided at the rear ends thereof with valves 39 through which the air may be forced as it is compressed by the pistons, the escape of the air through the said valves being slow so that it does not in any manner detract from the efficiency thereof as a cushion for the piston. Similar valves 40 are also shown as provided at the forward ends of the cylinders. It will be entirely obvious, that should it be so desired, compressed air could be utilized for positively operating the pistons when the device is applied to an automobile or other vehicle in a manner somewhat analogous to that for operating the shock absorber when applied to a ship.

Referring to Figs. 7 and 8 in which a still further modification of the invention is shown, the numeral 42 designates the end of a ship, and 43 a shock absorber similar to that previously described. As in the previous instance, this shock absorber is provided with the piston rods 44 which pass through the hull of the ship and terminate in pistons which operate within the air cylinders 45, coil springs 46 being provided which surround the piston rods and operate as in the previous instance to hold the shock absorber normally in a projected position and to coöperate with the pistons in the air cylinders to absorb all shocks and jars such as would be incident to a collision. Means is also provided for positively moving the shock absorber into and out of operative position, and for this purpose the shock absorber is connected to rods 47 which pass through the ship and are provided at their inner ends with racks 48, the said racks being engaged by pinions 49 on opposite ends of a shaft 50. This shaft 50 is supported by a bearing 51 within which it is journaled, the said bearing being provided with a downwardly extending arm 52 which passes loosely through a sleeve 53 and has a threaded engagement at its lower end with a friction gear wheel 54 so that by turning the said gear wheel the arm can be moved up and down and the pinions 49 thereby moved either into or out of engagement with the racks 48. A driving shaft 55 which is journaled within the bearings 56 is located under the shaft 50 and receives power from a suitable motor 57. A sleeve 58 is keyed upon this driving shaft 55 so as to rotate therewith but slide freely thereon. Rigid with this sleeve 58 are the gear wheels 59 and 60, the said gear wheel 59 being shown in Fig. 8 as meshing with a gear wheel 61 upon a shaft 50, while the second gear wheel 60 meshes with an idler 62 journaled upon a frame 63. This frame 63 is connected by means of an arm 64 to a lever 65 by means of which it can be moved back and forth, and the lower end of the said frame engages the sleeve 58 so that the said sleeve can rotate freely but must slide back and forth with the frame. The upper shaft 50 has a second gear wheel 66 keyed thereon, and by moving the frame 63 to the right, the idler 62 can be thrown into mesh with this gear wheel 66, the gear wheel 59 upon the sleeve 58 being at the same time thrown out of mesh with the gear wheel 61. Owing to the fact that the idler 62 can be interposed between the gear wheel 66 and the gear wheel 60, the shaft 50 will rotate in one direction when the idler 62 engages the wheel 60, and in the opposite direction when the gear wheel 59 engages the gear wheel 61. It will thus be obvious that by suitably manipulating the lever 65, the gearing can be adjusted so as to rotate the shaft 50 in either direction and either retract the shock absorber into an inoperative position or project it into an operative position.

The opposite sides of the friction gear wheel 54 are designed to be engaged by vertically disposed friction wheels 67 which are journaled upon a sliding frame 68, the said sliding frame being connected to an operating lever 69. The driving shaft 55 is provided at a point under the friction gear wheel 54 with a wheel 70 engaging horizontal wheels 71 and 72 which are arranged upon opposite sides thereof and journaled upon suitable brackets. When the frame 68 is moved in one direction through the medium of the lever 69, one of the vertical wheels 67 is brought into engagement with the wheel 54 and the horizontal wheel 71 so that motion is transmitted from the drive shaft to the wheel 54 for either raising or lowering the shaft 50. In a reverse manner, by sliding the frame 68 in the opposite direction, the other vertical wheel 67 will be brought into engagement with the wheel 54 and the wheel 72 so as to turn the friction gear wheel 54 in the opposite direction. With this construction, it will be apparent that by suitably manipulating the lever 69 the shaft 50 can be either raised or lowered through the medium of the gearing, and the pinions 49 thereby thrown either into or out of operative position. When the sliding frame 68 is at an intermediate position, as indicated in Fig. 8, neither of the vertical wheels 67 is operative and the friction gear wheel 54 remains stationary. It will of course be understood that the friction gear wheel 54 is journaled within fixed bearings so that the said wheel is held securely against vertical movement.

Having thus described the invention, what I claim as new and desire to secure by Letters Patent, is:—

1. In a shock absorber, the combination of a propelled member formed with a pointed end, a shock absorbing element formed with diverging sides adapted to fit closely against the pointed end of the propelled member, a pair of parallel piston rods connected to the respective sides of the shock absorbing element, pistons upon the piston rods, and a pair of air cylinders mounted upon the propelled member and receiving the pistons so as to provide an air cushion for the shock absorbing element.

2. In a shock absorber, the combination of a propelled member formed with a pointed end, a shock absorbing element formed with diverging sides adapted to fit closely against the pointed end when retracted into an inoperative position, a pair of parallel piston rods projecting from the respective sides of the shock absorbing element, pistons upon the piston rods, a pair of air cylinders receiving the pistons and coöperating therewith to provide an air cushion for the shock absorbing element, and means for positively moving the shock absorbing element into and out of operative position.

3. In a shock absorber, the combination of an air cylinder adapted to be applied to the propelled member, a piston operating within the air cylinder, a piston rod connected to the piston and projecting in front of the propelled member, a shock absorbing member applied to the piston rod, gearing for positively moving the shock absorbing member in either direction, and means for throwing the gearing into and out of operative position.

In testimony whereof I affix my signature in presence of two witnesses.

GEORGE J. PLATO.

Witnesses:
M. A. FLYNN,
GEORGE HULL.